G. E. S. PHILLIPS & W. A. YOUNG.
Cheese-Knives.

No. 158,304.　　　　　　　　　　Patented Dec. 29, 1874.

WITNESSES:　　　　　　　　　　INVENTOR:

UNITED STATES PATENT OFFICE.

GEORGE E. S. PHILLIPS AND WILLIAM A. YOUNG, OF BERRYVILLE, VA.

IMPROVEMENT IN CHEESE-KNIVES.

Specification forming part of Letters Patent No. 158,304, dated December 29, 1874; application filed July 25, 1874.

*To all whom it may concern:*

Figure 1:
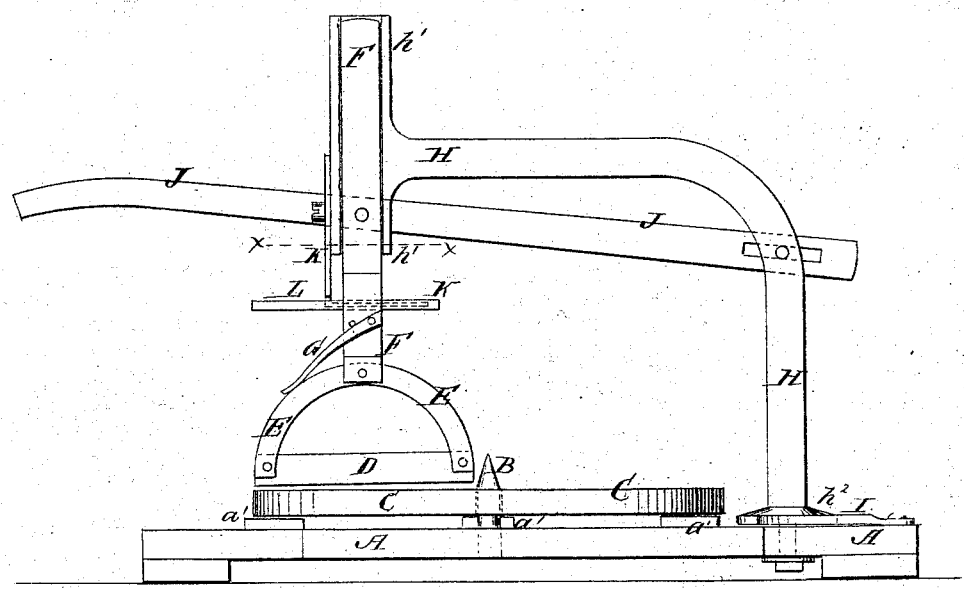
Figure 2:
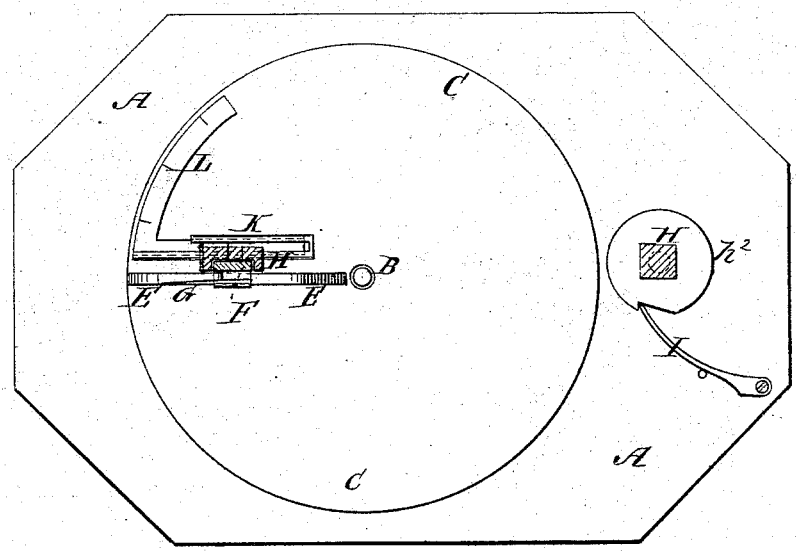

Be it known that we, GEORGE E. S. PHILLIPS and WILLIAM A. YOUNG, of Berryville, in the county of Clarke and State of Virginia, have invented a new and useful Improvement in Cheese-Knife, of which the following is a specification:

Figure 1 is a side view of our improved cheese-knife. Fig. 2 is a top view of the same, partly in section, through the line $x\,x$, Fig. 1.

Similar letters of reference indicate corresponding parts.

The invention will first be fully described, and then pointed out in the claims.

A represents the platform, table, or counter upon which the cheese is to be placed, and to which is attached a pivot, B, which passes through a hole in the cheese-board C upon which the cheese rests, and which projects so as to enter the cheese and keep it from slipping upon the said board C. To the board A are attached blocks or cleats $a'$, for the cheese-board C to rest upon, so that it may be firmly supported while the cheese is being cut, and so that there may be less friction when the cheese-board is being turned to adjust the cheese to be cut. D is the knife, which is made of such a length as to reach from the center to the edge of the cheese, and the ends of said knife are attached to the ends of a semicircular bar, E. The middle part of the curved bar E is attached to the lower end of the bar F in such a way that the bar E and knife D may have a slight longitudinal rock. The outer end of the knife D and bar E are held down by a spring, G, attached to the bar F, and the free end of which rests upon the outer end of the curved bar E, so that the knife may operate with a sliding cut, cutting the cloth first.

The bar F slides up and down in a groove in the side of the vertical cross-head $h'$, formed upon the end of the arm H, the other end of which is bent downward, and is pivoted to the board A. The pivoted end of the arm H has a collar, $h^2$, formed upon it, which rests upon the board A, and has a notch formed in its edge to receive the free end of the spring I attached to the board A, so as to stop the arm H in such a position that the knife D may be radial with respect to the cheese-board C.

This construction enables the arm and its attachments to be swung out of the way to enable a cover to be placed over the cheese.

The sliding bar F is connected with the lever J upon the other side of the cross-head $h^1$ by a bolt which passes through a vertical slot in said cross-head, so that the knife may be operated by operating the lever J. The rear end of the lever J has a short longitudinal slot formed in it to receive a pin or bolt, which also passes through a hole in the vertical part of the arm H, so that the said lever, when operated, may have a slight longitudinal movement to allow the sliding bar F to move up and down vertically.

Having thus described our invention, we claim as new, and desire to secure by Letters Patent—

1. The combination of the lever J, the curved and pivoted arm H, provided with a grooved and slotted cross-head, $h^1$, the sliding bar F, the curved bar E, and the knife D, with the pivoted cheese-board C, substantially as herein shown and described.

2. The combination of the spring G with the sliding bar F and the curved knife-holding bar E, substantially as herein shown and described.

GEORGE E. S. PHILLIPS.
WILLIAM A. YOUNG.

Witnesses:
A. W. McDONALD,
THOMAS JONES.